Aug. 19, 1930. E. M. DIEFFENBACH 1,773,099
PROCESS AND APPARATUS FOR THE DESTRUCTION OF INSECT LARVÆ
Filed Dec. 26, 1929
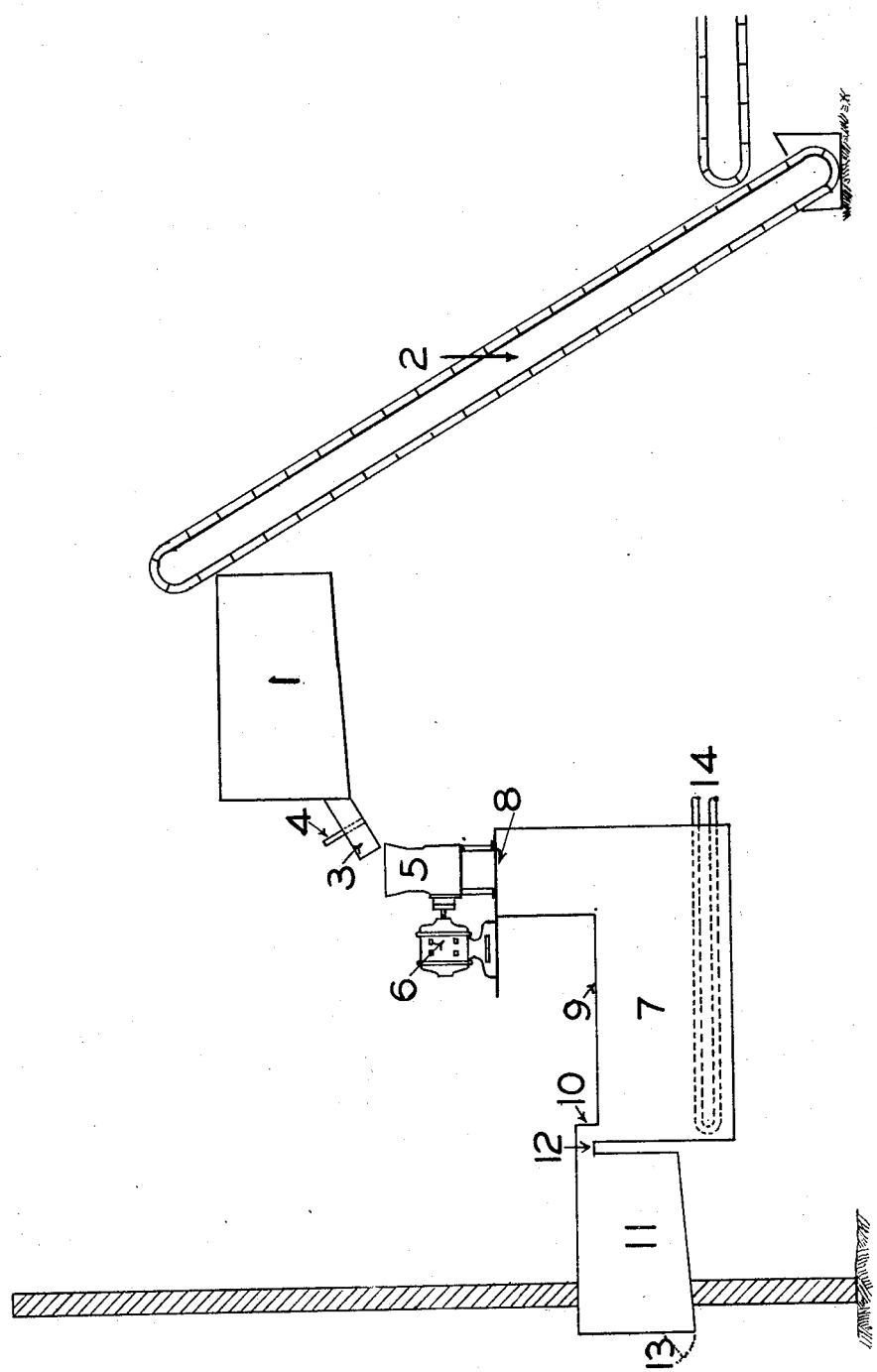
Ernest A. Sandstrum
WITNESS
Emery M Dieffenbach
INVENTOR Patented Aug. 19, 1930

1,773,099

UNITED STATES PATENT OFFICE

EMERY M. DIEFFENBACH, OF ORLANDO, FLORIDA

PROCESS AND APPARATUS FOR THE DESTRUCTION OF INSECT LARVÆ

Application filed December 26, 1929. Serial No. 416,684.

(GRANTED UNDER THE ACT OF MARCH 3, 1883, AS AMENDED APRIL 30, 1928; 370 O. G. 757)

This application is made under the act approved March 3, 1883, (c. 143; 22 Stat. 625), as amended by the act approved April 30, 1928, (c. 460; 45 Stat. 462), and the invention herein described, if patented, may be manufactured and used by or for the Government for governmental purposes without payment to me of any royalty thereon.

I hereby dedicate the invention herein described to the free use of the public, to take effect upon the granting of a patent to me.

The main object of the invention is to provide a process for the destruction of insect larvæ by drowning, and the provision of special apparatus therefor.

The apparatus is shown in the accompanying drawing, which is a side elevation of the entire apparatus.

Referring to the drawing, it will be seen that 1 represents a bin into which the culls of oranges or other fruit, in which the insect larvæ are present, are deposited, preferably by means of the endless conveyor assembly 2, which is conventional in design. Bin 1 is provided with a discharge spout 3, equipped with valve 4 to permit of the discharge of oranges, etc., at any desired rate of speed into the grinding device 5, operated by motor 6, both of which are supported at the top of vat 7. As the orange or other culls pass through grinder 5, they are pulped and fall into vat 7. This vat is so constructed that the entrance end 8 thereof for the culls is somewhat higher than the top 9 of the main body thereof and at the opposite end 10 of said vat from the entrance end 8, the vat 7 is so constructed as to permit of an overflow therefrom of the pulp into an adjoining and communicating vat 11, through aperture 12. Aperture 12 is so arranged that it extends above the top 9 of vat 7 so that the pulp is discharged from vat 7 through aperture 12 into vat 11, as a result of the pressure of the pulp in vat 7. By reason of this arrangement, it will be obvious that if vat 7 is kept filled with pulp up to the top 9, the insect larvæ present in the pulp will continue to be submerged in the pulp without having access to the air and inasmuch as it is planned to hold the pulp in vat 7 for approximately three days' time, it will be seen that the insect larvæ in the pulp will be effectually destroyed by drowning. After the insect larvæ have been destroyed in vat 7, the pulp is discharged into vat 11, and this is accomplished by the addition of fresh pulp to vat 7, which causes the old pulp which has been retained therein for several days to flow into vat 11. Vat 11 is provided with a valve 13, shown in open position by means of dotted lines.

If desired, chemicals, such as calcium cyanamide may be mixed with the fruit culls at the time they are pulped, or thereafter, in order to facilitate the destruction of the insect larvæ. It should be understood that the pulp in vat 7 may be heated to an elevated temperature by any suitable means, such as heating coils 14, live steam, etc., in order to accelerate the destruction of the insect larvæ.

I claim:

1. A process for the destruction of insect larvæ present in fruit culls, which consists in pulping said culls, and holding the said pulp out of contact with the air for a period of several days, whereby the insect larvæ are drowned.

2. An apparatus for the destruction of insect larvæ in fruit culls, which comprises means for pulping said culls, means for holding said pulped material out of contact with the air, whereby the insect larvæ are drowned.

3. An apparatus for the destruction of insect larvæ in fruit culls, which comprises means for pulping said culls, means for holding said pulped material out of contact with the air, means for heating said pulped material and maintaining the same at an elevated temperature, whereby the insect larvæ are destroyed.

EMERY M. DIEFFENBACH.